H. F. CRIM & W. C. LOY.
AUTOMOBILE LOCK.
APPLICATION FILED JUNE 27, 1908.
931,684.
Patented Aug. 17, 1909.
2 SHEETS—SHEET 1.
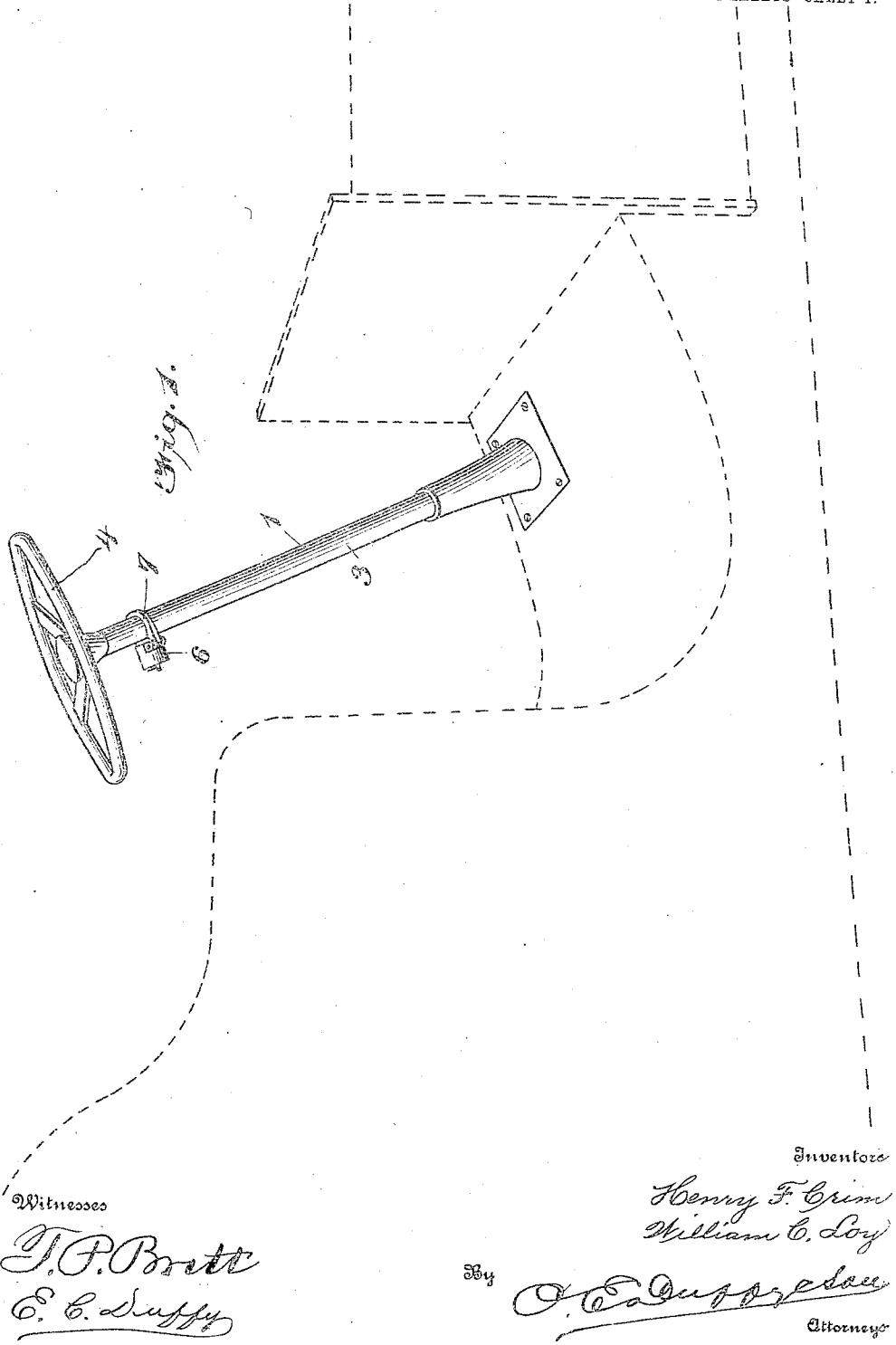
Witnesses
T. P. Brett
E. C. Duffy
Inventors
Henry F. Crim
William C. Loy
By
Attorneys

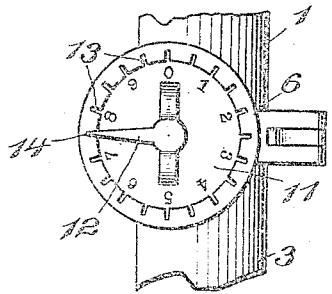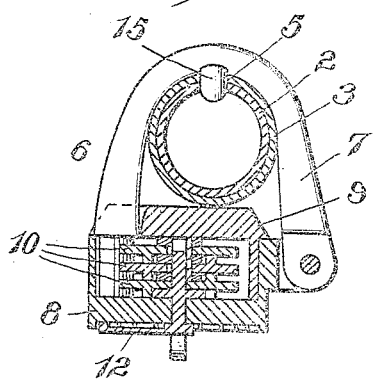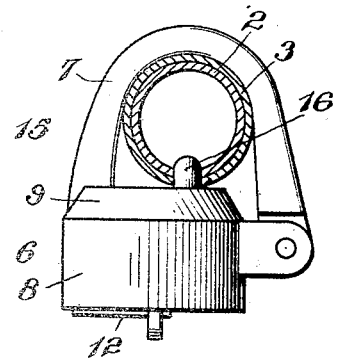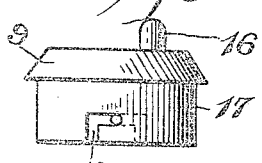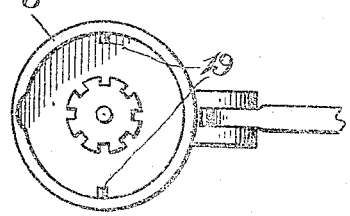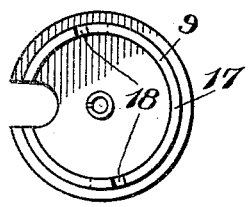

UNITED STATES PATENT OFFICE.

HENRY F. CRIM AND WILLIAM C. LOY, OF ROCHESTER, INDIANA.

AUTOMOBILE-LOCK.

No. 931,684.  Specification of Letters Patent.  Patented Aug. 17, 1909.

Application filed June 27, 1908. Serial No. 440,770.

*To all whom it may concern:*

Be it known that we, HENRY F. CRIM and WILLIAM C. LOY, citizens of the United States, residing at Rochester, in the county of Fulton and State of Indiana, have invented certain new and useful Improvements in Automobile-Locks; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to the class of locks, but more particularly to a device for locking automobiles or the like in such manner that the steering column of the automobile is locked and securely held against movement, to such an extent that the machine cannot be operated while the lock is in position on the steering column.

With this object in view our invention consists in the novel construction and arrangement of the lock.

Referring to the accompanying drawing: Figure 1 is a perspective view illustrating our lock in operative position on the steering column of the automobile. Fig. 2 is an elevation of the lock. Fig. 3 is a horizontal sectional view taken through the steering column and through the body of the lock. Fig. 4 is a plan view showing a slight modification. Fig. 5 is an elevation of the cap of the locking case. Fig. 6 is a plan view of the locking case with the tumblers removed, and Fig. 7 is a plan view of the cap of the case.

Like numerals of reference indicate the same parts throughout the several figures in which;

1 indicates the steering column of an automobile which, as shown in Figs. 3 and 4, comprises an inner tube 2 and an outer tube or sleeve 3. Connected to the inner tube 2 at the upper end of the column is a suitable wheel 4.

5 indicates an opening or perforation made in the outer tube 3 and inner tube 2 in such manner that an object passed through said perforation will prevent the inner tube 2 from rotating within the outer tube or sleeve 3, it of course being understood that the outer tube or sleeve 3 is stationary and does not turn with the steering wheel 4.

6 indicates the pad-lock which may be of any usual form, but as shown in Figs. 2, 3 and 4, is preferably of a permutation type having a shackle 7 and top or casing 8, a top or cap 9, a series of tumblers 10, a dial 11 and a pointer 12, said pointer being arranged to be rotated over the dial 11.

In order to make it possible to operate the lock at night we construct the dial 11 with a series of notches 13 into which the point 14 of the pointer 12 enters. By this construction a clicking sound is made when the pointer 12 is moved over the face of the dial, and by counting the number of clicks the lock can thus be operated in the dark.

Referring now to Fig. 3 it will be seen that the shackle 7 is provided with a lug or projection 15 preferably about the center of said shackle, said lug or projection 15 being of such a size that it will conveniently enter the perforation 5 in the inner and outer tubes 2 and 3 of the steering column.

Referring now to Figs. 4 and 5 it will be seen that the cap or top 9 of the casing 8 is provided with a lug or projection 16, said lug or projection being placed eccentrically on said cap or top and being of such a size as to conveniently enter the perforation 5 in the inner and outer tubes 2 and 3 of the steering column.

Referring to Figs. 5 and 7 it will be seen that the top or cap 9 of the casing is provided with a vertical wall or flange 17, and said wall is slotted at 18 in order to register with two pins or lugs 19 formed on the inside of the casing 8 as clearly shown in Fig. 6, thus forming a bayonet joint or connection with the top or cap 9 and the casing 8, thus rendering it necessary to rotate the top or casing 8 a short distance in order to remove the top or cap 9 from the casing.

Having thus described the several parts of our invention its operation is as follows: While we have shown a lock of the permutation type it is of course clearly evident that any type of locking mechanism or tumblers can be employed as we lay no claim to any specific construction for maintaining the shackle 7 in a locked position. The inner and outer tubes 2 and 3 being provided with the perforation 5 the lock is applied to the steering column, the shackle 7 encompass- ing said column, and the lug or projection 15 caused to enter the perforation 5, said lug or projection passing entirely through both the inner tube 2 and the outer tube 3 as shown in Fig. 3, the end of the shackle entering the lock casing and being locked therein. When the lock is in this position it is of course clearly obvious that the steering column cannot be operated, thus making it impossible to use the automobile and effectually locking the same. As will appear, however, from Figs. 4 and 5 a lug or projection 16 can be formed on the cap or top 9 of the casing, which lug or projection 16 enters the perforation 5 in the steering column, passing entirely through the inner tube 2 and outer tube 3, thus effectually locking the steering column against movement. When this latter construction is employed the lug or projection 16 being eccentrically mounted on the top or cap 9, said top or cap cannot be rotated or moved while the lock is in position on the steering column, for the reason that the ececentric location of the lug or projection 16 makes it impossible to rotate the top or cap in order to open the lock.

Having thus fully described our invention what we claim as new and desire to secure by Letters Patent of the United States, is:

1. A device of the character described for locking the steering column of an automobile or the like, comprising a body or casing, a shackle, a lug or projection on said shackle arranged to enter the steering column of an automobile or the like and to pass through the outer tube and enter the inner tube of said steering column to prevent movement of said steering column.

2. A device of the character described for locking a steering column of an automobile comprising a lock casing adapted to engage the said column, a shackle thereon adapted to be passed around a steering column, locking mechanism within said lock casing, the said casing being adapted to receive the free end of said shackle, and a lug or projection on said device adapted to enter a steering column and to pass through the outer tube and enter the inner tube thereof when the said shackle is in a locked position, the whole arranged in such manner that the said shackle and the said casing are adapted to encompass a steering column.

3. A pad-lock comprising a shackle and a body, said body being adapted to engage a steering column, said shackle being adapted to be passed around a steering column, a lug or projection on said pad-lock adapted to enter the steering column and to pass through the outer tube and enter the inner tube thereof for locking the same against movement, the whole arranged in such manner that the said shackle and the said body encompass the steering column.

In testimony whereof, we affix our signatures, in presence of two witnesses.

HENRY F. CRIM.
WILLIAM C. LOY.

Witnesses:
FLOYD J. MATTICE,
JULIUS ROWLEY.